(12) United States Patent
Liu et al.

(10) Patent No.: US 8,848,149 B2
(45) Date of Patent: Sep. 30, 2014

(54) CONTROLLABLE OPTICAL DEVICE AND THE FORMING METHOD THEREOF

(75) Inventors: Li-Wei Liu, Taichung (TW); Chih-Wei Chen, Zhongli (TW); Yong-Ren Su, Taichung (TW); Yi-Pai Huang, Chiayi (TW)

(73) Assignee: National Chiao Tung University, Hsinchu (TW)

( * ) Notice: Subject to any disclaimer, the term of this patent is extended or adjusted under 35 U.S.C. 154(b) by 237 days.

(21) Appl. No.: 13/338,685

(22) Filed: Dec. 28, 2011

(65) Prior Publication Data
US 2013/0088682 A1 Apr. 11, 2013

(30) Foreign Application Priority Data
Oct. 6, 2011 (TW) .............................. 100136269 A

(51) Int. Cl.
*G02F 1/1333* (2006.01)
*G02F 1/13* (2006.01)
*G02F 1/1337* (2006.01)
*G02B 3/14* (2006.01)

(52) U.S. Cl.
CPC ...................................... *G02B 3/14* (2013.01)
USPC ............ 349/138; 349/122; 349/123; 349/200

(58) Field of Classification Search
USPC ................... 349/200, 122–123, 138; 359/253
See application file for complete search history.

(56) References Cited

U.S. PATENT DOCUMENTS

| | | | | |
|---|---|---|---|---|
| 7,903,212 | B2 * | 3/2011 | Hashimoto et al. | 349/114 |
| 8,553,197 | B2 * | 10/2013 | Galstian et al. | 349/200 |
| 2006/0256267 | A1 * | 11/2006 | Bone et al. | 349/122 |
| 2008/0297880 | A1 * | 12/2008 | Steckl et al. | 359/291 |
| 2009/0219475 | A1 * | 9/2009 | Tseng et al. | 349/123 |
| 2011/0096250 | A1 * | 4/2011 | Cha et al. | 349/15 |

* cited by examiner

Primary Examiner — Nathanael R Briggs
(74) Attorney, Agent, or Firm — Bacon & Thomas, PLLC

(57) ABSTRACT

A controllable optical device comprises a first substrate, a first conductive layer, a liquid crystal layer, a semiconductor conductive layer, a second conductive layer, and a second substrate. The first conductive layer is formed on the first substrate, the liquid crystal layer is formed on the first conductive layer, the semiconductor conductive layer is formed on the liquid crystal layer, the second conductive layer is formed on the semiconductor layer, and the second substrate is formed on the second conductive layer.

6 Claims, 7 Drawing Sheets

CONTROLLABLE OPTICAL DEVICE AND THE FORMING METHOD THEREOF

BACKGROUND OF THE INVENTION

1. Field of the Invention

The invention relates to an optical device, particularly to a controllable optical device.

2. Description of the Prior Art

The liquid crystal lens or liquid lens is composed of liquid crystal polymer mixture or oil and water mixture. The arrangement of these fluids will be changed in accordance with the change of electrical field distribution. This property is utilized by the optical device to focus or diverge the light beam.

The conventional optical focus-changing lens set needs at least two lenses to obtain the focus-changing effect. The shortcoming of the method is that it is heavier and larger than current optical focus-changing lens set.

In addition, in order to obtain the required phase retardation effect, the liquid crystal lens usually needs thicker liquid crystal layer. However, thicker liquid crystal layer will cause longer response time. For example, if the liquid crystal layer is 60 μm thick, its response time will be about 30 seconds, and operation voltage will be greater than 30 voltages.

In the prior art, the overdrive way has been used to operate the liquid crystal display, in order to improve the focusing time of liquid crystal. However, it needs extra circuit for overdrive, thus it becomes a burden for the cost.

The liquid lens mainly controls the position and distribution of oil and water in the box to form light focusing or light diverging device. However it has to overcome the viscous force and need larger voltage. In addition, if the operation voltage is not large enough, the response speed will be very slow.

Therefore, in order to produce more effective liquid lens, provide better production technology to the industry, it is necessary to research and develop the innovative liquid lens, so as to increase the production efficiency of liquid lens and reduce the manufacturing cost.

SUMMARY OF THE INVENTION

As much as the above-mentioned problems, the main purpose of the invention is to provide an optical device, which can employ double refractive and arrangement variance characteristics of liquid crystal molecule to focus or diverge the light beam, in order to modulate the focus through changing the operation voltage.

Another purpose of the invention is to provide a controllable optical device, it is light, thin, short and small, and it is able to achieve optical focus-changing in a small space.

According to the above-mentioned purposes, the invention provides a controllable optical device, which includes a first substrate, a first conductive layer, a liquid crystal layer, a semiconductor conductive layer, a second conductive layer, and a second substrate. The first conductive layer is formed on the first substrate, the liquid crystal layer is formed on the first conductive layer, the semiconductor conductive layer is formed on the liquid crystal layer, the second conductive layer is formed on the semiconductor layer, and the second substrate is formed on the second conductive layer.

The invention provides another controllable optical device, which includes a first substrate, a liquid molecule layer, a hydrophobic layer, a semiconductor conductive layer, a first conductive layer, and a second substrate. The liquid molecule layer is formed on the first substrate, the hydrophobic layer is formed on the liquid molecule layer, the semiconductor conductive layer is formed on the hydrophobic layer, the first conductive layer is formed on the semiconductor layer, and the second substrate is formed on the first conductive layer.

In order to understand the above-mentioned purposes, characteristics and advantages of present invention more obviously, the detailed explanation is described as follows with preferred embodiments and figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
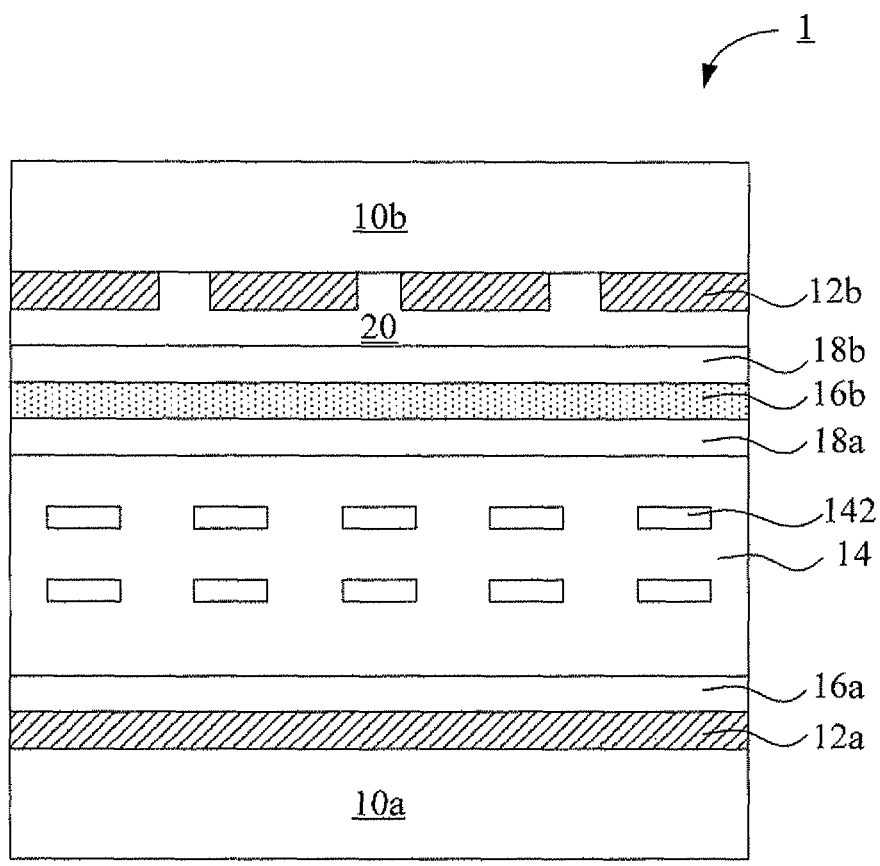
FIG. 1 illustrates a cross-section diagram for a controllable optical device disclosed by the invention.

FIG. 1 illustrates a cross-section diagram for a controllable optical device disclosed by the invention. As shown in FIG. 1, the optical device 1 comprises a first substrate 10a, a first conductive layer 12a, a liquid crystal layer 14, a semiconductor layer 20, a second conductive layer 12b and a second substrate 10b. In the embodiment, the first conductive layer 12a is formed on the first substrate 10a, the liquid crystal layer 14 is formed on the first conductive layer 12a, the semiconductor layer 20 is formed on the liquid crystal layer 14, the second conductive layer 12b is formed on the semiconductor layer 20, and the second substrate 10b is formed on the second conductive layer 12b. Wherein, the first conductive layer 12a and the second conductive layer 12b are used as the control electrodes for the optical device 1 with controllable voltage, all are transparent conductive layers. The Indium Tin Oxide (ITO) is often used as the material of transparent conductive layer. The other suitable materials include Indium Zinc Oxide (IZO) or other nontransparent metals, such as copper (Cu), gold (Au) or silver (Ag).

In addition, as shown in FIG. 1, the second conductive layer 12b is etched to get required electrode pattern. In the embodiment, the second conductive layer 12b is a long stripe electrode or a plurality of stripe electrode, which is designed in accordance with the requirement of actual structure. In addition, the electrode on the second conductive layer 12b further includes a margin control electrode (not shown in the figure) and a central control electrode (not shown in the figure). In another embodiment, the second conductive layer 12b can be the cylindrical or circular structure too.

As shown in the embodiment of FIG. 1, a first liquid crystal alignment layer 16a and a second liquid crystal alignment layer 16b are places below and above the liquid crystal layer 14, respectively. In another embodiment, a first insulation layer (or first protection layer) 18a is placed between the liquid crystal layer 14 and the second liquid crystal alignment layer 16b, and a second insulation layer (or second protection layer) 18b is placed between the semiconductor layer 20 and the second liquid crystal alignment layer 16b, wherein the second insulation layer 18b is used to protect the semiconductor layer 20. In addition, in another embodiment, it is not necessary to have the first insulation layer (or first protection layer) 18a in the above-mentioned structure. In the invention, the first substrate 10a and the second substrate 10b are glass substrates. The material of semiconductor layer 20 should have transparent property with $10^{-4}$ to $10^{14}$ Ω-cm of resistivity. In an embodiment, the Zinc Oxide (ZnO) containing compound is used as the material of the semiconductor layer. Other derived materials, such as the Indium Zinc Oxide (IZO), Aluminum Zinc Oxide (AZO), Indium Zinc Tin Oxide (IZTO) and Indium Gallium Zinc Oxide (IGZO) and so on also can be used as the material of the semiconductor layer 20 in controllable the optical device 1. In the embodiment, the above-mentioned material of the semiconductor layer 20 is able to confine the applied energy between the electrodes effectively, in order to form a progressive voltage distribution between the electrodes, and the voltage distribution can be linear or nonlinear. Thus, the distribution of liquid crystal can be modulated to form the effect of liquid crystal lens or prism.

In addition, as shown in FIG. 1, upon manufacturing the material of semiconductor layer 20, the target material is deposited on the semiconductor layer to form a thin film through sputtering at room temperature. In another embodiment, the spin coating can be employed to form the semiconductor layer 20. In the embodiment, the semiconductor layer 20 is able to provide a low current flowing among the electrodes, so as to achieve the advantage of lower voltage operation. Meantime, because very small current is passed, thus an equivalent voltage drop will be distributed on the semiconductor layer 20, which can form a concept of "equivalent approximate infinite micro control electrodes on the semiconductor layer". Thus, the distribution of electric field will be more uniform in the box, which is able to get the liquid crystal lens with better optical quality and focusing effect. In addition, comparing to the conventional liquid crystal lens, it employs the margin electric field effect to change the distribution of liquid crystal molecule, which will cause the shortcoming of slow response speed. While the method disclosed by the invention can improve the response speed of liquid crystal effectively.

In addition, still as shown in FIG. 1, the resistivity range of semiconductor layer 20 can be improved to $10^3$ to $10^8$ Ω-cm through the process, such as passing oxygen or doping process. The same result is also able to be obtained by switching the electrode structure of the first substrate 10a and the second substrate 10b.

Figure 2A:
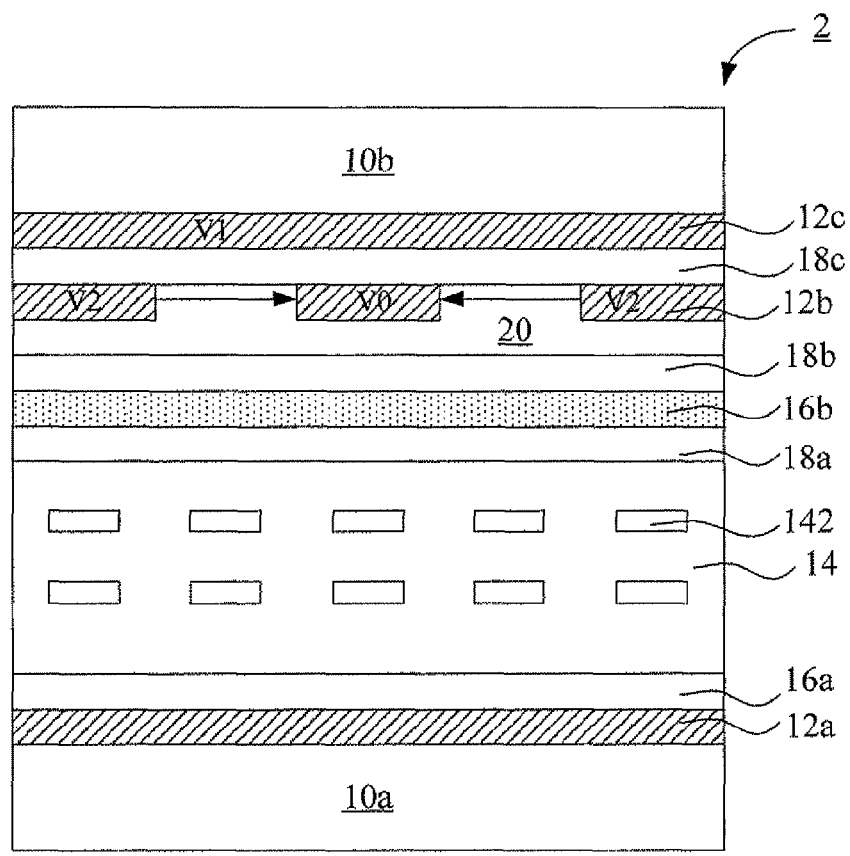
FIG. 2A illustrates a cross-section diagram for a controllable optical device and liquid crystal layer and long stripe electrode disclosed by the invention.
Figure 2B:
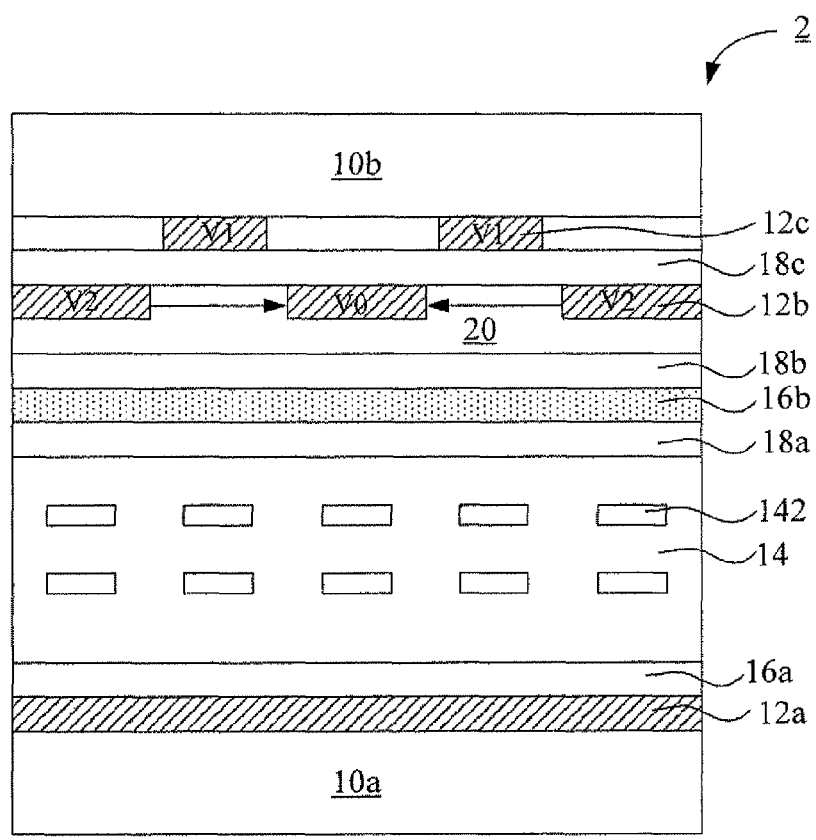
FIG. 2B illustrates a cross-section diagram for a controllable optical device and liquid crystal layer and lapped first conductive layer and second conductive layer disclosed by the invention.

FIG. 2 illustrates another controllable optical device 2 disclosed by the invention. As shown in FIG. 2A, the structure of optical device 2 is almost the same as optical device 1, which will not be described any more. The difference is that a third conductive layer 12c is formed on the second conductive layer 12b near the second substrate 10b, and the third conductive layer 12c and the second conductive layer 12b are lapped each other. The third conductive layer 12c is used as the flat board (or display) control electrode or the control electrode with pattern. In addition, a third insulation layer 18c is filled between the third conductive layer 12c and the second conductive layer 12b. Similarly, the width and shape of electrode can be designed in accordance with the requirement, wherein the width and of electrode can be smaller than, equal to, or larger than the gap area. In this embodiment, the electrode pattern on the third conductive layer 12c can be formed by the etching, which may be a long stripe electrode or a plurality of stripe electrode as shown in FIG. 2B.

As the embodiment shown in FIG. 2A and FIG. 2B, the second conductive layer 12b may be a plurality of stripe electrode and the third conductive layer 12c may be a long stripe electrode. In another embodiment, the second conductive layer 12b may be a plurality of stripe electrode and the third conductive layer 12c may be a plurality of stripe electrode too. The second conductive layer 12b and the third conductive layer 12c are lapped each other. In addition, the shape of second conductive layer 12b is the cylindrical or circular structure, and the third conductive layer 12c is a long stripe electrode. The shape of second conductive layer 12b and the shape of third conductive layer 12c may be the cylindrical or circular structure.

As shown in FIG. 2A and FIG. 2B, it is necessary to adopt doping or processing to get suitable resistivity for the material of semiconductor layer 20. In the embodiment, a control electrode layer (third conductive layer 12c) is added to the optical device 2 with controllable voltage. It is able to adjust the equivalent resistivity (or current) of corresponding semiconductor area through adjusting the voltage of subject gate electrode layer (not shown in the Figure). Thus, it will be able to provide larger degree of freedom for the control requirement.

As the embodiment shown in FIG. 2A and FIG. 2B, it is able to adjust the current of the second conductive layer 12b and the third conductive layer 12c near the second substrate 10b. Under a suitable voltage $V_1$, the current flowing through the semiconductor layer 20 (as the arrow shown in the figure) will reach a maximum stable value. The semiconductor layer 20 can become an equivalent plane electrode. This operation way can accelerate the rotation of liquid crystal molecule 142 in the liquid crystal layer 14. Thus, in the embodiment, it only needs a suitable voltage to let the current flowing through the semiconductor layer 20 reach a maximum stable value. To the contrary, the conventional technique has to provide a large voltage in a constant time to accelerate the rotation of liquid crystal molecule in the liquid crystal layer through the overdrive way. Thus, the operation way of this embodiment can accelerate the response speed of liquid crystal by low operation voltage.

In addition, as the embodiment shown in FIG. 2A and FIG. 2B, after the above-mentioned operation, the semiconductor layer 20 can become an equivalent plane electrode, and the voltage will be the same as $V_2$. At this time, $V_1$ can be turned off, or a certain voltage can be applied continuously for the operation.

As another operation way shown in FIG. 2A and FIG. 2B, the gate electrode voltage between 0 to $V_1$ volts is provided to adjust the current flowing through the gap of stripe electrode. Thus, different equivalent voltage drop will be distributed on the semiconductor layer 20, which can form a concept of "equivalent approximate infinite micro control electrodes on the semiconductor layer". Thus, it is able to adjust the corresponding voltage distribution to get the application with higher degree of freedom.

Figure 3A:
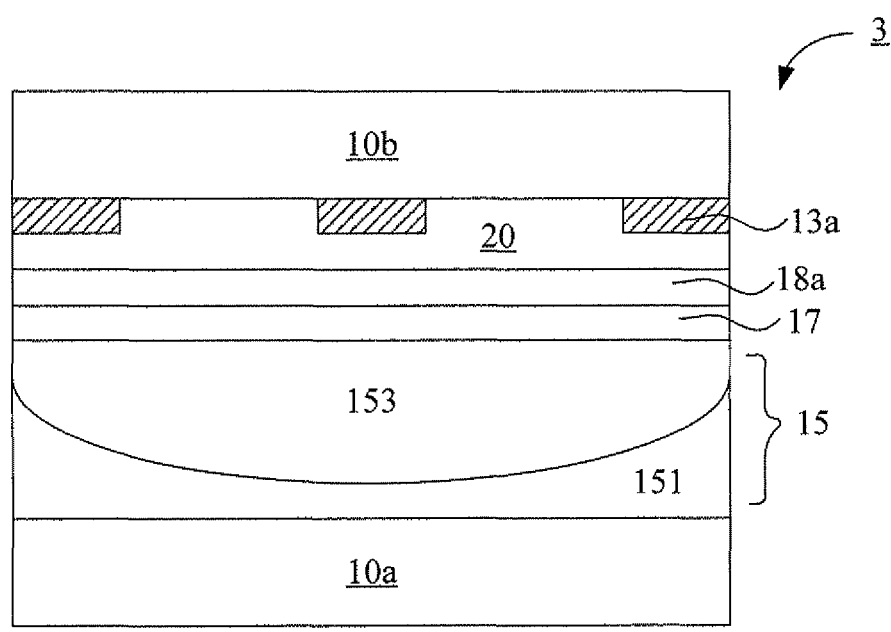
FIG. 3A illustrates a cross-section diagram for a controllable optical device and liquid molecule layer disclosed by the invention.
Figure 3B:
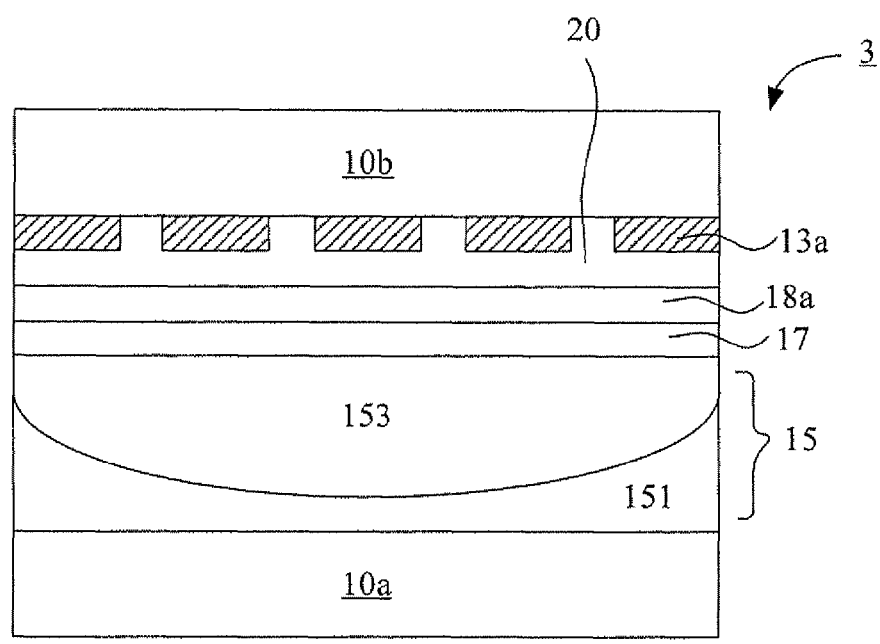
FIG. 3B illustrates a cross-section diagram for another controllable optical device and liquid molecule layer disclosed by the invention.

Referring to FIG. 3A and FIG. 3B, the invention provides another optical device 3 with controllable voltage. As shown in FIG. 3A, the first conductive layer 13a may be a long stripe electrode, or a cylindrical or circular electrode (not shown in the figure). As shown in FIG. 3B, the first conductive layer 13a may be a plurality of stripe (more than one stripe) electrode, or a cylindrical or circular electrode. In addition, the structure of controllable optical device 3 is similar to FIG. 1, thus its structure, characteristics of material and method of fabrication will not be described any more. The difference with FIG. 1 is that the liquid crystal layer 14 is substituted by the liquid molecule layer 15, wherein the liquid molecule layer 15 is the mixture of oil 153 and water 151. As shown in FIG. 3A and FIG. 3B, the arrangement way of oil 153 and water 151 may be water 151 at up layer and oil 153 at bottom layer. In addition, the liquid crystal layer 14 should possess the liquid crystal alignment layer 16a, 16b (as shown in FIG. 1). In this embodiment, the hydrophobic layer 17 is used associated with the liquid molecule layer 15.

As the control way shown in FIG. 3A and FIG. 3B, different voltage is applied to the first conductive layer 13a to change the distribution of liquid on the liquid molecule layer 15, in order to achieve the focusing effect.

Figure 4A:
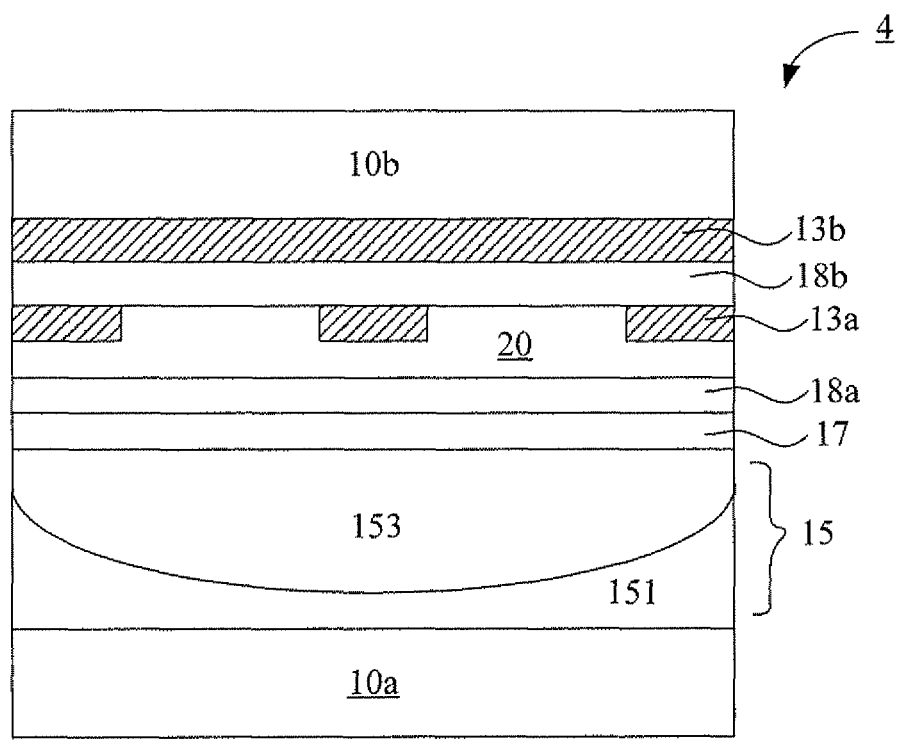
FIG. 4A illustrates a cross-section diagram for a controllable optical device and liquid molecule layer and long stripe electrode disclosed by the invention.
Figure 4B:
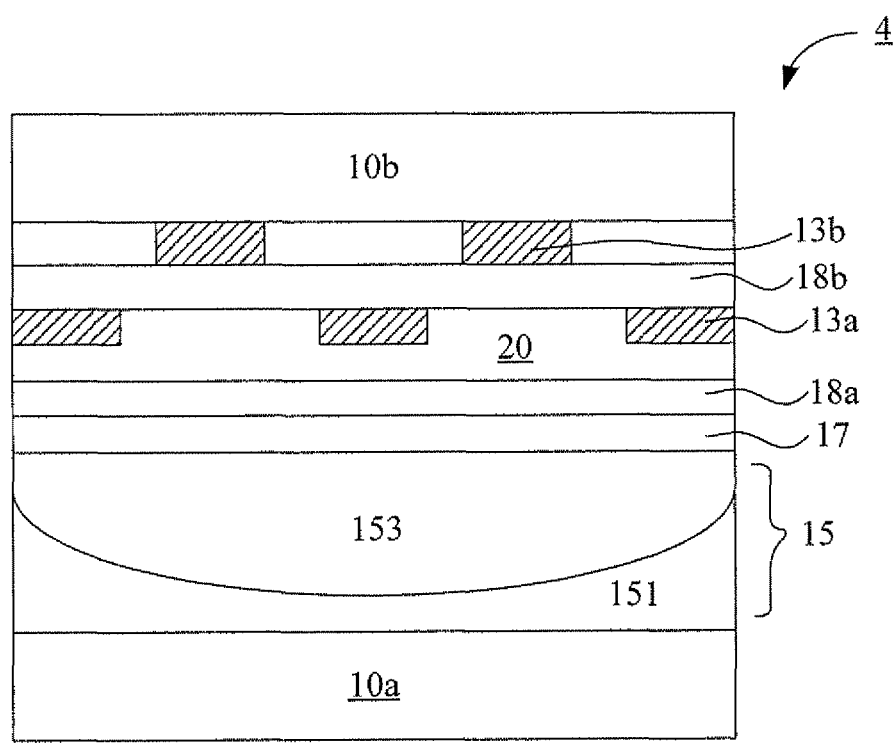
FIG. 4B illustrates a cross-section diagram for a controllable optical device and liquid molecule layer and lapped first conductive layer and second conductive layer disclosed by the invention.

Referring to FIG. 4A and FIG. 4B, the invention provides another controllable optical device 4. In the embodiment, the structure, material, and voltage control way of controllable optical device 4 is similar to FIG. 3A and FIG. 3B, thus it will not be described any more. The difference is that a control electrode layer is added to the controllable optical device 4 near the second substrate 10b. It is able to adjust the equivalent resistivity of corresponding semiconductor area through adjusting the voltage of subject gate electrode layer. Thus, it will be able to provide larger degree of freedom for the control requirement. General speaking, under the ideal condition, all characteristics between the insulator and conductor of the semiconductor layer 20 can be obtained through this kind of adjustment.

The fabrication method shown in the above-mentioned FIG. 4A and FIG. 4B can also be used to fabricate the circular or cylindrical liquid crystal lens. The cylindrical liquid crystal lens can normally be applied in the bare eye type stereo display with small or large size. The circular liquid crystal lens can be applied in the lens module of cellular phone. Its structure is the same as the cylindrical liquid crystal lens, only the circuits on the first substrate 10a and the second substrate 10b are different.

The liquid crystal lens or liquid lens disclosed in the invention can reduce the volume of optical focus-changing device, which can provide the optical focus-changing effect in a small space. In addition, on the three-dimensional stereo display, it can be used as the optical device array for current bare eye type stereo display, in order to reach the use of planar or three-dimensional switch etc. In addition, the liquid crystal lens or liquid lens can also be used as the diffractive light route device, such as the advance direction of diffractive laser light etc. Upon utilizing the device design structure provided by the invention, and cooperating with suitable operation mode, it not only can improve the light focusing or diffracting effect, but also can tremendously reduce the response time and operation voltage of these optical devices, in order to increase the possibility of practical application.

In addition, according to the design of controllable optical device provided by the invention, the semiconductor material is introduced into the liquid crystal lens or the liquid lens, and suitable voltage driving way is employed, in order to get the advantages of fast response, low operation voltage, good optical quality and better operatability.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A controllable optical device, comprising:
   a first glass substrate (10a);
   a first conductive layer (12a) formed on the first glass substrate (10a), wherein a material of the first conductive layer (12a) is selected from the group consisting of a transparent conductive layer, and a nontransparent conductive layer;
   a liquid crystal layer (14) formed on the first conductive layer (12a) and a first liquid crystal alignment layer (16a) placed below the liquid crystal layer (14);
   a first insulation layer (18a) is placed between the liquid crystal layer (14) and a second liquid crystal alignment layer (16b);
   a second insulation layer (18b) is placed between a semiconductor layer (20) and the second liquid crystal alignment layer (16b);
   a second conductive layer (12b) as a long stripe electrode, wherein the material of the second conductive layer is selected from the group consisting of the transparent conductive layer, and the nontransparent conductive layer;
   the semiconductor layer (20), wherein a material of semiconductor layer (20) is selected from the group consisting of Indium Zinc Oxide (IZO), Aluminum Zinc Oxide (AZO), Indium Gallium Zinc Oxide (IGZO) and Indium Zinc Tin Oxide (IZTO);
   the second conductive layer (12b) formed on the semiconductor layer (20); and
   a second glass substrate (10b) formed on the second conductive layer (12b) in order to form the controllable optical device.

2. The device according to claim 1, wherein the second conductive layer further comprises a plurality of stripe electrode.

3. The device according to claim 1, wherein the material of transparent conductive layer is selected from the group consisting of Indium Tin Oxide (ITO) and Indium Zinc Oxide (IZO).

4. The device according to claim 1, wherein the material of nontransparent conductive layer is selected from the group consisting of silver (Ag), and copper (Cu).

5. The device according to claim 1, wherein, a third conductive layer (12c) further comprises formed on the second conductive layer, and the third conductive layer and the second conductive layer are lapped each other, wherein the third conductive layer is a long stripe electrode.

6. The device according to claim 5, wherein the third conductive layer further comprises a plurality of stripe electrode.

* * * * *